(12) United States Patent
Liu et al.

(10) Patent No.: US 11,151,559 B2
(45) Date of Patent: Oct. 19, 2021

(54) BLOCKCHAIN-BASED REMITTANCE METHOD AND APPARATUS

(71) Applicant: Advanced New Technologies Co., Ltd., Grand Cayman (KY)

(72) Inventors: Zheng Liu, Hangzhou (CN); Baoli Ma, Hangzhou (CN); Wenbin Zhang, Hangzhou (CN); Lichun Li, Hangzhou (CN); Shan Yin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/085,240

(22) Filed: Oct. 30, 2020

(65) Prior Publication Data
US 2021/0049594 A1 Feb. 18, 2021

Related U.S. Application Data

(63) Continuation of application No. PCT/CN2019/095529, filed on Jul. 11, 2019.

(30) Foreign Application Priority Data

Aug. 30, 2018 (CN) .......................... 201811005187.9

(51) Int. Cl.
*G06Q 20/38* (2012.01)
*G06Q 20/40* (2012.01)
(Continued)

(52) U.S. Cl.
CPC .......... *G06Q 20/389* (2013.01); *G06Q 20/065* (2013.01); *G06Q 20/38215* (2013.01);
(Continued)

(58) Field of Classification Search
CPC ............... G06Q 20/389; G06Q 20/401; G06Q 20/38215; G06Q 40/02; G06Q 20/4037;
(Continued)

(56) References Cited

U.S. PATENT DOCUMENTS 5,903,880 A * 5/1999 Biffar .................... G06Q 20/06 235/379
10,565,570 B2 * 2/2020 Chan .................. G06Q 20/0655
(Continued)

FOREIGN PATENT DOCUMENTS

CN 101286859 10/2008
CN 106920080 7/2017
(Continued)

OTHER PUBLICATIONS

Franca, "Homomorphic Mini-blockchain Scheme," 2015. (Year: 2015).*

(Continued)

*Primary Examiner* — Jacob C. Coppola
(74) *Attorney, Agent, or Firm* — Fish & Richardson P.C.

(57) ABSTRACT

One or more embodiments of the present specification provide blockchain-based remittance methods and apparatuses. One method comprising: receiving, from an account of a remitter, a transaction for a remittance to an account of a remittee, wherein the transaction comprises a remittance amount of the remittance and at least one reserved amount corresponding to the remittance amount allocated by the remitter from a reserve fund list to the transaction; performing verification of the transaction, wherein the verification comprises determining whether a total amount of the at least one reserved amount comprised in the transaction is greater than or equal to the remittance amount; and in response to determining that the verification is successful: deducting the remittance amount from the balance of the account of the remitter, and adding the remittance amount to a balance of the account of the remittee.

16 Claims, 6 Drawing Sheets

(51) Int. Cl.
  *G06Q 40/02* (2012.01)
  *H04L 9/00* (2006.01)
  *H04L 9/32* (2006.01)
  *G06Q 20/06* (2012.01)

(52) U.S. Cl.
  CPC ....... *G06Q 20/401* (2013.01); *G06Q 20/4037* (2013.01); *G06Q 40/02* (2013.01); *H04L 9/008* (2013.01); *H04L 9/3221* (2013.01); *G06Q 20/3825* (2013.01); *G06Q 20/3829* (2013.01); *G06Q 2220/00* (2013.01)

(58) Field of Classification Search
  CPC ........... G06Q 20/3825; G06Q 20/3829; G06Q 2220/00; H04L 9/008; H04L 9/3221
  See application file for complete search history.

(56) References Cited

U.S. PATENT DOCUMENTS

| | | | |
|---|---|---|---|
| 2015/0046337 A1 | 2/2015 | Hu et al. | |
| 2016/0080156 A1* | 3/2016 | Kaliski, Jr. | H04L 9/3247 713/176 |
| 2016/0260169 A1* | 9/2016 | Arnold | G06Q 40/12 |
| 2016/0358165 A1* | 12/2016 | Maxwell | G06Q 20/0655 |
| 2019/0139037 A1* | 5/2019 | Khalil | G06Q 20/027 |
| 2019/0164153 A1* | 5/2019 | Agrawal | H04L 9/008 |
| 2019/0228388 A1 | 7/2019 | Hu et al. | |
| 2019/0228391 A1 | 7/2019 | Hu et al. | |
| 2019/0295070 A1* | 9/2019 | MacQuilken | G06Q 20/206 |
| 2020/0028693 A1* | 1/2020 | Wu | H04L 9/008 |
| 2020/0193425 A1* | 6/2020 | Ferenczi | H04L 9/3218 |

FOREIGN PATENT DOCUMENTS

| | | |
|---|---|---|
| CN | 107862600 | 3/2018 |
| CN | 108183959 | 6/2018 |
| CN | 108229943 | 6/2018 |
| CN | 108364229 | 8/2018 |
| CN | 109325747 | 2/2019 |
| TW | I631520 | 8/2018 |
| WO | 2018007828 | 1/2018 |
| WO | WO-2019072268 A2 * | 4/2019 ......... G06Q 20/3674 |

OTHER PUBLICATIONS

Okamoto et al., "A New Public-Key Cryptosystem as Secure as Factoring," Advances in Cryptology—EUROCRYPT '98, International Conference on the Theory and Application of Cryptographic Techniques, Espoo, Finland, May 31-Jun. 4, 1998, all pages. (Year: 1998).*
Groth, "Homomorphic Trapdoor Commitments to Group Elements," all pages. (Year: 2009).*
Cecchetti et al., "Solidus: Confidential Distributed Ledger Transactions via PVORM," Association for Computing Machinery, all pages. (Year: 2017).*
Maxwell, "Confidential Transactions," web.archive.org, all pages. (Year: 2015).*
Shmatikov, Vitaly, "Introduction to Zero-Knowledge," cs.utexas.edu/~shmat/courses/cs380s_fall09/16zk.ppt, web.archive.org, all pages. (Year: 2017).*
Bootle et al., "Bulletproofs: Efficient Range Proofs for Confidential Transactions," 39th IEEE Symposium onSecurity and Privacy, May 2018, all pages. (Year: 2018).*
"From Zero (Knowledge) to Bulletproofs," joinmarket.me/static/FromZK2BPs_v1.pdf, web.archive.org (Oct. 1, 2018), all pages. (Year: 2019).*
Pedersen, "Non-Interactive and Information-Theoretic Secure Verifiable Secret Sharing," Advances in Cryptology—CRYPTO '91, LNCS 576, pp. 129-140, 1192, all pages. (Year: 1992).*
Damgard et al., "Perfect Hiding and Perfect Binding Universally Composable Commitment Schemes with Constant Expansion Factor," CRYPTO 2002, LNCS 2442, pp. 581-296, 2002, all pages. (Year: 2002).*
Bootle et al., "Bulletproofs: Short Proofs for Confidential Transactions and More," 2018 IEEE Symposium on Security and Privacy, all pages. (Year: 2018).*
R. Yu, G. Xue, V. T. Kilari, D. Yang and J. Tang, "CoinExpress: A Fast Payment Routing Mechanism in Blockchain-Based Payment Channel Networks," 2018 27th International Conference on Computer Communication and Networks (ICCCN), 2018, pp. 1-9, doi: 10.1109/ICCCN.2018.8487351. (Year: 2018).*
J. Poon and T. Dryja, "The Bitcoin Lightning Network: Scalable Off-Chain Instant Payments," Whitepaper, Jan. 2016. (Year: 2016).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/095529, dated Oct. 11, 2019, 10 pages (with partial English translation).
PCT International Preliminary Report on Patentability in International Application No. PCT/CN2019/095529, dated Mar. 2, 2021, 9 pages (with English translation).
Extended European Search Report in European Application No. 19855723.3, dated Jul. 1, 2021, 8 pages.

* cited by examiner

BLOCKCHAIN-BASED REMITTANCE METHOD AND APPARATUS

CROSS-REFERENCE TO RELATED APPLICATIONS

This application is a continuation of PCT Application No. PCT/CN2019/095529, filed on Jul. 11, 2019, which claims priority to Chinese Patent Application No. 201811005187.9, filed on Aug. 30, 2018, and each application is hereby incorporated by reference in its entirety.

TECHNICAL FIELD

One or more embodiments of the present specification relate to the field of blockchain technologies, and in particular, to blockchain-based remittance methods and apparatuses.

BACKGROUND

Blockchains are tamper-resistant and shared digital ledgers used to record transactions in public or private peer-to-peer networks. Transactions are recorded into ledgers after consensuses are reached by nodes of the blockchains, and the ledgers are distributed to all or most of member nodes in the networks. History records of asset transactions occurring in the networks are permanently recorded in blocks. There are two existing blockchain asset transaction modes: In a UTXO model, one transaction input is spent only once, and then a new transaction output is generated. Therefore, this mode naturally has high transaction concurrency. In an account model, each transaction of the same user updates the same account balance. To ensure that a balance is enough for payment, all related transactions of one user need to be executed in series based on a global time sequence. Otherwise, the transactions will be rejected by a consensus node because the account balance is insufficient. Therefore, the account model limits a possibility of concurrent transactions.

SUMMARY

In view of this, one or more embodiments of the present specification provide blockchain-based remittance methods and apparatuses, electronic devices, and computer-readable storage media.

To achieve the previous objective, one or more embodiments of the present specification provide the following technical solutions:

According to a first aspect of the one or more embodiments of the present specification, a blockchain-based remittance method is provided, where a remitter account includes a reserve fund list; and the reserve fund list includes multiple reserved amounts obtained by dividing a balance of the remitter account; and the method includes the following: receiving a first transaction that is sent by a remitter and that is used for remittance to a remittee, where the first transaction includes a remittance amount that is remitted by the remitter account to a remittee account and at least one reserved amount that corresponds to the remittance amount and that is allocated by the remitter from the reserve fund list to the first transaction; performing first transaction verification on the first transaction, where the first transaction verification includes a first verification step used to verify whether a total reserved amount included in the first transaction is greater than or equal to the remittance amount; and if yes, the first transaction succeeds in the first verification step; and if the first transaction succeeds in the first transaction verification, deducting the remittance amount from the balance of the remitter account, and adding the remittance amount to a balance of the remittee account.

According to a second aspect of the one or more embodiments of the present specification, a blockchain-based remittance apparatus is provided, where a remitter account includes a reserve fund list; and the reserve fund list includes multiple reserved amounts obtained by dividing a balance of the remitter account; and the apparatus includes the following: a receiving unit, configured to receive a first transaction that is sent by a remitter and that is used for remittance to a remittee, where the first transaction includes a remittance amount that is remitted by the remitter account to a remittee account and at least one reserved amount that corresponds to the remittance amount and that is allocated by the remitter from the reserve fund list to the first transaction; a first transaction verification unit, configured to perform first transaction verification on the first transaction, where the first transaction verification unit includes a first verification module, configured to verify whether a total reserved amount included in the first transaction is greater than or equal to the remittance amount; and an account update unit, configured to, if the first transaction succeeds in the first transaction verification, deduct the remittance amount from the balance of the remitter account, and add the remittance amount to a balance of the remittee account.

According to a third aspect of the one or more embodiments of the present specification, a computer device is proposed, including a memory and a processor, where the memory stores a computer program executable by a processor; and when executing the computer program, the processor performs the previous blockchain-based remittance method.

According to a fourth aspect of the one or more embodiments of the present specification, a computer-readable storage medium is proposed, where the computer-readable storage medium stores a computer program, and when executed by a processor, the computer program performs the steps of the previous blockchain-based remittance method.

According to the blockchain-based remittance methods and apparatuses provided in the present specification, multiple reserved amounts are generated based on an account balance, and the multiple reserved amounts are allocated to multiple remittance transactions. Whether existing remittance transactions can afford payment is verified based on an account balance of a remitter account. Different from such verification, in the remittance method provided in the present specification, a blockchain node verifies, based on a reserved amount included in each remittance transaction, whether each remittance transaction can afford payment. The verification on remittance transactions is separately performed and does not affect each other. As such, a blockchain constructed based on an account model can send multiple remittance transactions in parallel.

DESCRIPTION OF EMBODIMENTS

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the example embodiments below do not represent all implementations consistent with one or more embodiments of the present specification. On the contrary, the implementations are only examples of apparatuses and methods that are described in the appended claims in detail and consistent with some aspects of one or more embodiments of the present specification.

It should be noted that, steps of a corresponding method in other embodiments are not necessarily performed in a sequence shown and described in the present specification. In some other embodiments, the method can include more or less steps than steps described in the present specification. In addition, a single step described in the present specification can be divided into multiple steps for description in other embodiments; and multiple steps described in the present specification can be combined into a single step for description in other embodiments.

Figure 1:
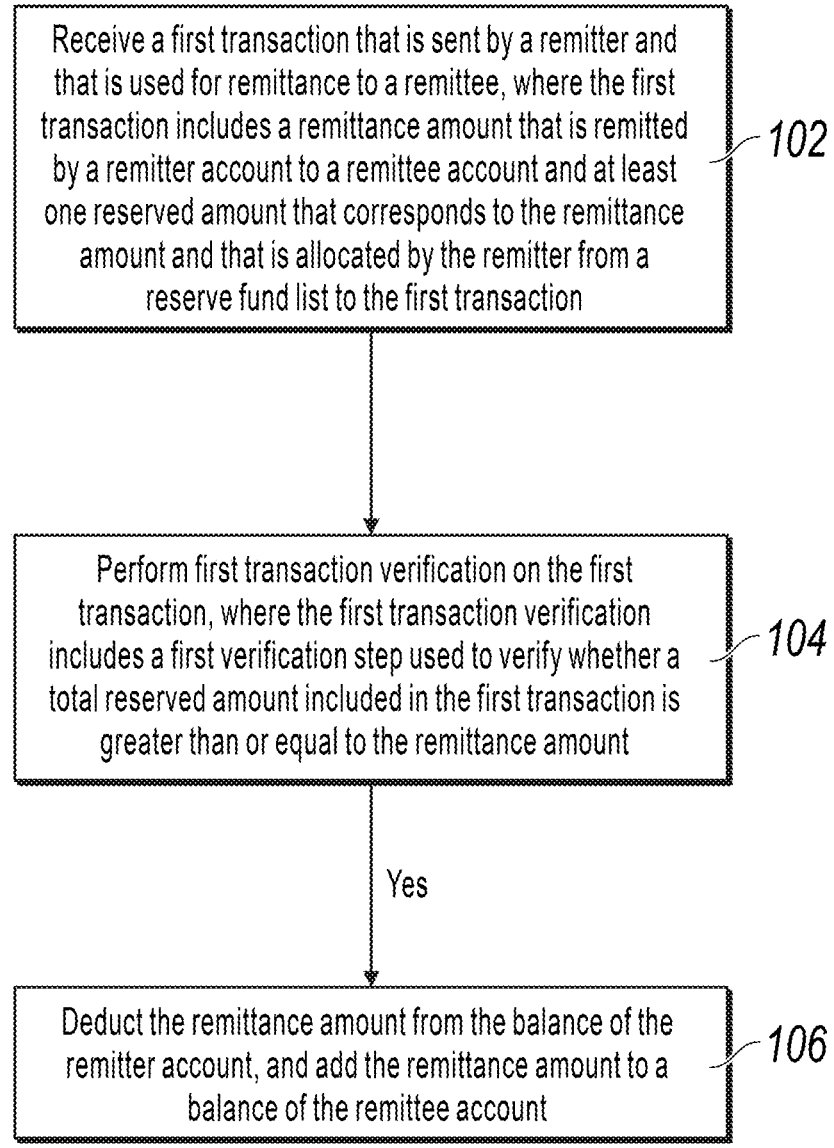
FIG. 1 is a flowchart illustrating a blockchain-based remittance method, according to some example embodiments.

FIG. 1 is a flowchart illustrating a blockchain-based remittance method, according to some example embodiments. The blockchain-based remittance method is used for remittance from a remitter account to a remittee account, where the remitter account includes a reserve fund list; and the reserve fund list includes multiple reserved amounts obtained by dividing a balance of the remitter account.

The blockchain described in the previous embodiments can be specifically a P2P network system that has a distributed data storage structure and that is implemented by nodes by using a consensus mechanism. Data in the blockchain is distributed in time-connected "blocks", the next block includes a data digest of the previous block, and full data backup is implemented for all or some of the nodes based on a specific consensus mechanism (for example, POW, POS, DPOS, or PBFT, etc.). A person skilled in the art knows that, because a blockchain system runs under a corresponding consensus mechanism, data that has been recorded in a blockchain database is difficult to be tampered with by any node. For example, on a blockchain that uses the POW consensus, existing data can be tampered with only under an attack with at least 51% of network-wide computing power. Therefore, the blockchain system is characterized by data security and anti-attack and tamper-resistant performance incomparable by other centralized database systems. It can be seen that, in some embodiments provided in the present specification, remittance transactions and other transactions that are recorded into the distributed database of the blockchain are hard to attack or tamper with, thereby providing proofs for transactions published to the distributed database of the blockchain.

The previous blockchain is used as a general-purpose de-centralized platform for management object state conversion. The previous account is a stateful object. Content included in the remitter account can be content included in a state of the remitter account. A person skilled in the art knows that the account generally includes account balance information.

In the present specification, the remitter account further includes a reserve fund list to support concurrent transactions generated based on the balance of the remitter account. The reserve fund list includes multiple reserved amounts obtained by dividing the account balance, so that at least one of the multiple reserved amounts can be allocated to a remittance transaction that the reserved amount is sufficient to pay. As the reserve fund list can include multiple available reserved amounts, the remitter can initiate, based on the multiple available reserved amounts, multiple remittance transactions that the reserved amounts are sufficient to pay.

It should be noted that the "account" described in the present specification is not limited to an externally owned account (EOA) and a contract account, and is not limited to a specific representation form of the previous reserve fund list, either, provided that a data organization form that includes or manages the multiple reserved amounts obtained by dividing a total reserved amount belongs to the reserve fund list described in the present specification.

As shown in FIG. 1, the remittance method can include the following steps:

Step 102: Receive a first transaction that is sent by a remitter and that is used for remittance to a remittee, where the first transaction includes a remittance amount that is remitted by the remitter account to a remittee account and at least one reserved amount that corresponds to the remittance amount and that is allocated by the remitter from the reserve fund list to the first transaction.

The first transaction is the remittance transaction described in the present specification. The remittance amount remitted (transferred) from the remitter blockchain account to the remittee blockchain account corresponds to a proof of asset of a corresponding amount: The proof of asset can correspond to intelligent assets such as a token and a digital asset in the blockchain. The proof of asset can alternatively correspond to off-chain assets such as cash, securities, coupons, and real estate outside the blockchain. No limitation is imposed in the present specification.

There can be multiple ways for allocating the at least one reserved amount included in the first transaction, where the at least one reserved amount is allocated by the remitter from the reserve fund list to the first transaction and corresponds to the remittance amount. No limitation is imposed in the present specification. For example, the reserve fund list of the remitter account includes the following four reserved amounts: {5,10,15,20}. For a first transaction whose remittance amount is 10, the remitter can select one reserved amount of 10 (or 15 or 20) from the four reserved amounts and allocate the reserved amount of 10 (or 15 or 20) to the first transaction. For a first transaction whose remittance amount is 12, the remitter can select one reserved amount of 15 (or 20) from the four reserved amounts and allocate the reserved amount of 15 (or 20) to the first transaction, or can select two reserved amounts of 5 and 10 (or 5 and 15) from the four reserved amounts and allocate the two reserved amounts of 15 (or 20) to the first transaction, so as to use the total two reserved amounts to provide the remittance transaction with a verification proof indicating that the reserved amounts are sufficient to pay. It should be noted that each reserved amount cannot be re-allocated, to alleviate "double-spending" and ensure that duplicate remittance transactions cannot be verified.

In some embodiments illustrated in the present specification, to ensure that the reserved amount allocated to the first transaction has not been used in other remittance transactions, the reserved amount can be marked in the reserve fund list to reduce "double-spending" transactions generated based on the same reserved amount. Especially, when the reserve fund list includes multiple equal-value reserved amounts, it is difficult for a verification node to identify whether reserved amounts of an equal value have been used in other transactions. The remitter account can mark the reserved amounts in multiple ways.

For example, a corresponding unique code or identifier can be generated for each reserved amount in the reserve fund list of the remitter account. In this case, the first transaction includes not only the reserved amount but also a unique identifier (e.g., code) of the reserved amount. As a proof of a completed remittance transaction is stored in the distributed database of the blockchain, a unique identifier of a reserved amount that has been used in the completed remittance transaction is also stored in the distributed database of the blockchain together with the completed remittance transaction. Therefore, the unique identifier of the reserved amount included in the first transaction can help a blockchain node verify whether the reserved amount has been used in other remittance transactions.

For another example, a use status identifier can further be generated for each reserved amount in the reserve fund list of the remitter account. When a remittance transaction including a reserved amount is verified, the remittance transaction is recorded in the distributed database of the blockchain, and a balance of a remitter account of the remittance transaction is updated, the reserved amount included in the remittance transaction should be identified in a "used state" (state 3) in a reserve fund list of the remitter account. A person skilled in the art knows that the remittance transaction recorded in the distributed database of the blockchain can be referred to as a "completed remittance transaction". For a new and uncompleted remittance transaction, the verification node in the blockchain can verify whether a reserved amount in the transaction is in the used state in the reserve fund list of the remitter account. If yes, the verification fails, and the transaction can be rejected; or if not, the verification succeeds. Similarly, when the new remittance transaction is updated to the distributed database of the blockchain after being verified, the blockchain node should also update the reserved amount included in the new remittance transaction to the "used state" in the reserve fund list of the remitter account.

Preferably, an unused reserved amount, that is, a reserved amount that has not been allocated to any remittance transaction, can be marked in an "unused state" (state 1) in the reserve fund list. Once a reserved amount is allocated to a remittance transaction, the reserved amount can be immediately identified in a "being-used state" (state 2) in a reserve fund list of a remitter account, that is, the reserved amount is marked in the "being-used state" (state 2) in the reserve fund list stored locally by the remitter user. It can be seen that the remitter account can only allocate a reserved amount in the unused state (state 1) to a new remittance transaction, and then change an allocated reserved amount to the being-used state (state 2) locally after allocation to prevent repeated allocation of the same reserved amount.

To protect account privacy security of a blockchain user, in some existing blockchains, a user's account balance and a transaction amount of a remittance transaction are encrypted. The remittance method provided in the present specification can also be used in a blockchain in a privacy mode.

In some embodiments illustrated, an account balance, reserved amounts included in a reserve fund list, and a remittance amount of a remittance transaction of a blockchain user are all encrypted. As the account balance in the remitter account and the reserved amounts included in the reserve fund list are all encrypted, the account balance, the reserved amounts included in the reserve fund list, and the remittance amount of the remittance transaction of the blockchain user are encrypted based on the same homomorphic encryption algorithm to ensure that a node in the blockchain can successfully verify the remittance transaction and directly update the encrypted balances of the remitter and remittee accounts based on the encrypted remittance amount without decryption.

As both the remittance amount and the reserved amount included in the first transaction are in an encrypted state, to ensure that the reserved amount allocated to the first transaction is sufficient to pay the current remittance, the first transaction should further include a first zero knowledge proof generated based on the encrypted reserved amount and the encrypted remittance amount included in the first transaction. The first zero knowledge proof is used to prove that the total reserved amount allocated to the first transaction is greater than or equal to the remittance amount.

Zero knowledge proofing generally indicates that one (a verified party) can convince a verifier that an assertion is correct without providing the verifier with any useful information. In the present specification, the remitter provides the first zero knowledge proof generated based on the encrypted remittance amount and the encrypted reserved amount included in the first transaction, so that the node (verifier) in the blockchain can verify, without knowing specific values of the remittance amount and the reserved amount, that the total specific value of the reserved amount allocated to the first transaction is greater than or equal to the specific value of the remittance amount and is sufficient to pay the remittance transaction, that is, the node (verifier) in the blockchain performs zero knowledge verification on the first zero knowledge proof based on a zero knowledge proof algorithm, to determine whether the total reserved amount allocated to the first transaction is greater than or equal to the remittance amount.

The present specification does not limit a type of the previous homomorphic encryption algorithm, and can include an addition homomorphic encryption algorithm or an fully homomorphic encryption algorithm, provided that the homomorphic encryption algorithm can satisfy additive homomorphism and can support verification on a zero knowledge proof indicating that a piece of plaintext data belongs to a certain range, so that the encrypted remittance amount can be directly deducted from the encrypted balance of the remitter account, and the encrypted remittance amount can be directly added to the encrypted balance of the remittee account, and the remitter can directly provide a zero knowledge proof based on the encrypted remittance amount and the encrypted reserved amount to prove that the remittance amount is not greater than a total reserved amount corresponding to the encrypted reserved amount used in the transaction.

For example, the previous blockchain can support the Pedersen Commitment encryption algorithm that is based on elliptic curve parameters G and H, so as to ensure that an amount range can be verified in the encrypted state for encrypted amounts in the blockchain, and additive homomorphism can be implemented.

The present specification does not limit a specific type of the first zero knowledge proof. For example, a range proof technology in related technologies can be used, such as a Bulletproofs solution or a Borromean ring signature solution.

In yet some other embodiments illustrated, to prevent some nodes in the blockchain from malicious attacks on the blockchain, the first transaction can further include a second zero knowledge proof generated based on the encrypted remittance amount, where the second zero knowledge proof is used to prove that the remittance amount is not less than zero.

In still yet some other embodiments illustrated in the present specification, the first transaction can further include an identifier of the remitter account, such as an account address, or an account public key and an electronic signature made by the remitter. The electronic signature is a signature made by the remitter by using a private key of the remitter to sign content including the remittance amount of the first transaction, or the at least one reserved amount, or the previous zero knowledge proof, so that the blockchain node can verify the electronic signature to prevent another node from being counterfeited as the remitter and publishing the first transaction, publishing error information, or maliciously disrupting a transaction order.

Step 104: Perform first transaction verification on the first transaction, where the first transaction verification includes a first verification step used to verify whether a total reserved amount included in the first transaction is greater than or equal to the remittance amount; and if yes, the first transaction succeeds in the first verification step.

According to different consensus mechanisms relied on by the blockchain network, transaction verification nodes in the blockchain network and verification rules followed by verification nodes in the blockchain network are different. For example, in a public blockchain such as a bitcoin or Ethereum blockchain, all nodes in the blockchain have permission to verify transactions. In the bitcoin blockchain, the nodes need to verify content such as a transaction format, a signature, whether an input transaction of UTXO is valid, whether double-spending occurs, and whether an output value is not greater than an input value. In the Ethereum blockchain, the nodes need to verify content such as a transaction format, a signature, whether an account balance is sufficient to pay the current transaction, and whether double-spending occurs. In a consortium blockchain based on the PBFT consensus algorithm, nodes with a verification permission are preselected nodes with high credit, and content that the preselected nodes in the consortium blockchain needs to verify is usually customized based on specific content of transactions. Because the blockchain-based remittance method provided in the present specification can be applied to a blockchain that is based on multiple consensus mechanisms, a quantity and types of blockchain nodes that perform verification on the first transaction are not limited in the present specification, and content or a process included in the first transaction verification is not limited.

To ensure normal operation of the first transaction for remittance, in some embodiments provided in the present specification, it is necessary to verify at least whether the reserved amount included in the first transaction is sufficient to pay the remittance amount. The blockchain node can directly compare whether the total reserved amount included in the first transaction is greater than or equal to the total remittance amount of the first transaction. If yes, the first transaction succeeds in the first verification step.

In some embodiments illustrated, as previously described, when the reserve fund list further includes use states corresponding to the multiple reserved amounts, the use states include the used state, and the used state indicates that its corresponding reserved amount has been used in a completed remittance transaction of the blockchain, the first transaction verification further includes a second verification step used to verify whether the reserved amount included in the first transaction is marked in the used state in the reserve fund list; and if not, the first transaction succeeds in the second verification step. Correspondingly, if the first transaction succeeds in all verification steps included in the first transaction verification, the blockchain node needs to mark the reserved amount included in the first transaction in the used state in the reserve fund list.

More preferably, the use states of the reserved amounts further include the unused state and the being-used state. The unused state indicates that its corresponding reserved amount has not been allocated to an initiated remittance transaction, and the being-used state indicates that its corresponding reserved amount has been allocated to an initiated remittance transaction. After a local client allocates the at least one reserved amount to the first transaction, a remitter node can change a use status of the reserved amount included in the first transaction from "unused" to "being-used" to prevent re-allocation by the remitter.

It should be noted that "unused", "being-used", and "used" are three functional descriptions of the states that distinguish between reserved amounts. In specific implementation, the previous embodiments can be implemented with any identifiers or names that are adequate to distinguish between the three states.

In yet some other embodiments illustrated, as previously described, when the reserve fund list further includes unique identifiers corresponding to the reserved amounts and the first transaction further includes a unique identifier corresponding to the allocated reserved amount, the verification further includes a third verification step used to verify whether the unique identifier included in the first transaction has been used in a completed remittance transaction; and if not, the first transaction succeeds in the third verification step.

As described above, to protect user privacy of a blockchain, especially privacy of remittance transactions, when the remittance amount included in the first transaction and the reserved amounts are encrypted in advance, the first transaction should further include the first zero knowledge proof generated based on the encrypted reserved amount and the encrypted remittance amount included in the first transaction, so as to ensure that the blockchain node can verify whether the total reserved amount allocated to the first transaction is sufficient to pay the remittance amount, as other nodes except the remitter of the first transaction on the blockchain cannot know the specific values of the remittance amount and the reserved amount corresponding to the remittance amount in the first transaction. Correspondingly, the first verification step included in the first transaction verification includes performing zero knowledge verification on the first zero knowledge proof based on a zero knowledge proof algorithm to determine whether a total reserved amount allocated to the first transaction is greater than or equal to the remittance amount; and if yes, the first transaction succeeds in the first verification step.

In yet some other embodiments illustrated, as previously described, when the first transaction further includes a second zero knowledge proof generated based on the encrypted remittance amount, the first transaction verification further includes a fourth verification step of performing zero knowledge verification on the second zero knowledge proof based on a zero knowledge proof algorithm to determine whether the remittance amount is greater than or equal to zero; and if yes, the first transaction succeeds in the fourth verification step.

In yet some other embodiments illustrated, as previously described, when the first transaction further includes the electronic signature obtained by the remitter, the blockchain node with the verification permission should further verifies the electronic signature by using the public key of the remitter, so as to determine that the electronic signature and the first transaction are sent by the remitter and prevent counterfeit by other malicious nodes.

The terms "first", "second", "third", and "fourth" described in some embodiments provided in the present specification are merely intended to distinguish between the verification steps, but are not used to limit a sequence of performing the verification steps. For example, a person skilled in the art knows that, verification on an electronic signature is generally a verification step first performed in a verification stage, but a sequence of performing the previous verification steps is not limited in the present specification.

Step 106: If the first transaction succeeds in the first transaction verification, deduct the remittance amount from the balance of the remitter account, and add the remittance amount to a balance of the remittee account.

After the first transaction succeeds in the verification steps included in the first transaction verification, the first transaction can be recorded into a block of the blockchain, and the remitter account and the remittee account are updated accordingly: The remittance amount is deducted from the balance of the remitter account and is added to the balance of the remittee account.

Based on different consensus mechanisms relied on by an account status update process on the blockchain, blockchain nodes that update the balance of the remitter account and the balance of the remittee account can be the same as or different from the blockchain node that performs the transaction verification. The blockchain nodes that update the balance of the remitter account and the balance of the remittee account can be one node or multiple nodes determined after reaching a consensus. No limitation is imposed in the present specification.

When the remittance method described in the present specification is applied to a blockchain in the privacy mode, as the balance of the remitter account and the remittance amount of the first transaction used for remittance to the remittee are encrypted based on the same homomorphic encryption algorithm, the blockchain node can deduct the remittance amount from the balance of the remitter account through homomorphic encryption, and add the remittance amount to the balance of the remittee account through homomorphic encryption. To be specific, the encrypted remittance amount is directly subtracted from the encrypted balance of the remitter account to obtain an updated encrypted balance of the remitter account, and the encrypted remittance amount is directly added to the encrypted balance of the remittee account to obtain an updated encrypted balance of the remittee account, without decrypting the balances of the remitter account and remittee account and the remittance amount of the first transaction. A person skilled in the art knows that, based on a feature of a homomorphic encryption algorithm, a ciphertext obtained by directly subtracting the encrypted remittance amount from the encrypted balance of the remitter account is equivalent to a ciphertext obtained by encrypting an updated account balance obtained by directly subtracting the remittance amount from the balance of the remitter account by using the homomorphic encryption algorithm; and a ciphertext obtained by directly adding the encrypted remittance amount to the encrypted balance of the remittee account is equivalent to a ciphertext obtained by encrypting an updated account balance obtained by directly adding the remittance amount to the balance of the remittee account by using the homomorphic encryption algorithm.

According to the privacy encryption remittance method including steps 102 to 106 provided in the previous multiple embodiments of the present specification, multiple reserved amounts are generated based on an account balance, and the multiple reserved amounts are allocated to multiple remittance transactions; and a blockchain node verifies whether a reserved amount included in each remittance transaction is sufficient to pay the remittance transaction. Verification of the remittance transactions is separately performed without mutual impact, so that a blockchain constructed based on an account model can send multiple remittance transactions in parallel. In addition, the remittance method provided in the present specification can also be applied to blockchains in the privacy mode to generate the first zero knowledge proof based on the encrypted reserved amount and encrypted remittance amount to prove that the total reserved amount allocated to the first transaction is sufficient to pay the remittance amount. Because the reserve fund list includes multiple encrypted reserved amounts, multiple concurrent remittance transactions can be separately supported, which reduces a defect of remittance transaction concurrency failure, in existing private encrypted remittance, caused by generating a zero knowledge proof based on the remitter's account balance to prove that the reserved amount is sufficient to pay the remittance amount, thereby improving a remittance transaction throughput while protecting privacy of remittance transaction data.

To perform the remittance method described in the previous multiple embodiments, the remitter account needs to include the reserve fund list, so as to store the multiple reserved amounts obtained by dividing the balance of the remitter account. When the reserved amounts in the reserve fund list are used up, or a remaining reserved amount is insufficient to pay the next remittance transaction, or the user needs to periodically update the reserve fund list as needed, the remitter node needs to initialize the reserve fund list in its account. Establishing a reserve fund list (including a first initialized reserve fund list and a reset reserve fund list) through initialization can be implemented by publishing a reserve fund list initialization transaction on the blockchain. Optionally, a fixed-format transaction can be set on the blockchain specifically for initializing or updating a reserve fund list to help a user complete initialization of the reserve fund list.

As most nodes in the blockchain can perform remittance operations as remitters, the reserve fund list can be initialized or updated by most nodes in the blockchain.

Figure 2:
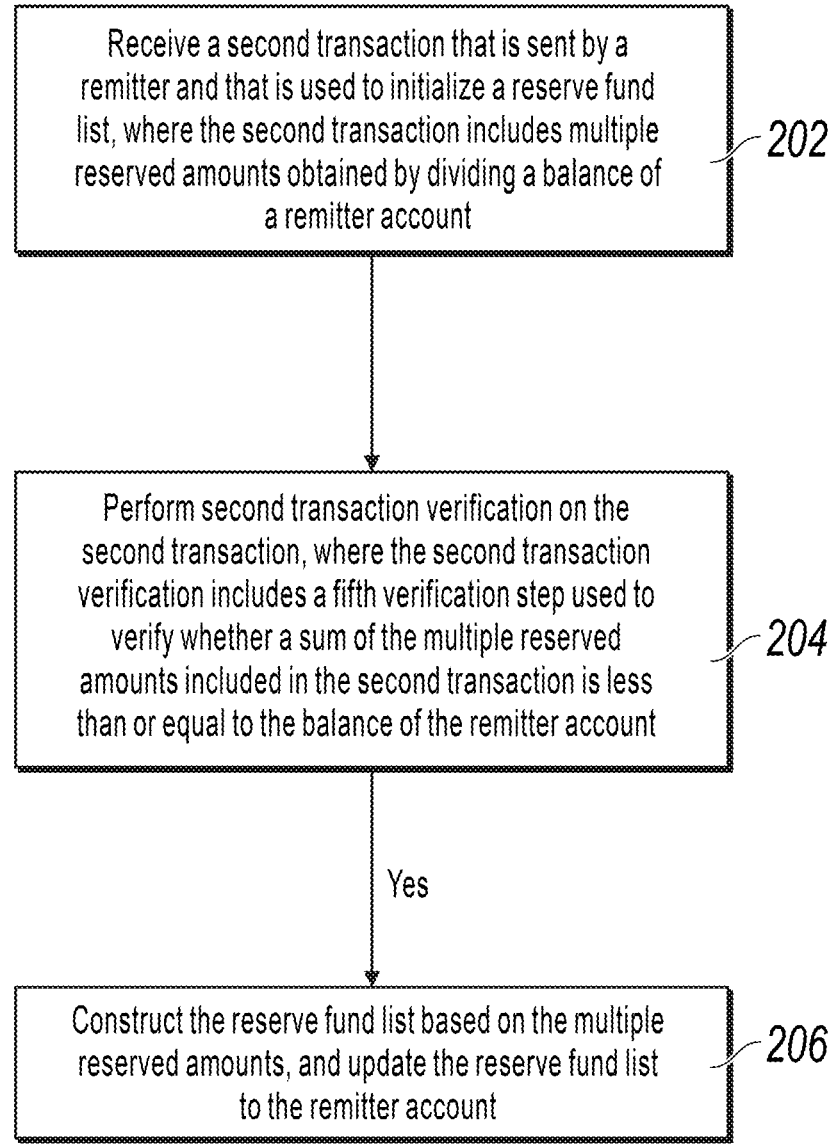
FIG. 2 is a flowchart illustrating reserve fund list setting in a blockchain network, according to some example embodiments.

In still some other embodiments illustrated in the present specification, as shown in FIG. 2, the previous method for initializing or updating a reserve fund list includes the following steps:

Step 202: Receive a second transaction that is sent by the remitter and that is used to initialize the reserve fund list, where the second transaction includes the multiple reserved amounts obtained by dividing the balance of the remitter account.

The second transaction is used to initialize the reserve fund list. To protect privacy and security of a user account, when a balance of a user account on the blockchain undergoes homomorphic encryption, the previous multiple reserved amounts should also undergo homomorphic encryption processing. The second transaction further includes a third zero knowledge proof generated based on the multiple encrypted reserved amounts and the encrypted balance of the remitter account, used to prove that a sum of the multiple reserved amounts included in the second transaction is less than or equal to the balance of the remitter account.

In the present specification, because the balance of the remitter account and the multiple reserved amounts obtained by the remitter by dividing the account balance are encrypted based on the previous homomorphic encryption algorithm, by providing the third zero knowledge proof generated based on the multiple encrypted reserved amounts and the encrypted balance of the remitter account, the remitter node can enable a blockchain node (verifier) to verify whether the sum of the multiple reserved amounts included in the second transaction is less than or equal to the balance of the remitter account, without knowing the actual values (plaintexts) of the account balance and the reserved amounts.

Similarly, the present specification does not limit a specific type of the third zero knowledge proof. For example, a range proof technology in related technologies can be used, such as a Bulletproofs solution or a Borromean ring signature solution.

In yet some other embodiments illustrated, to ensure that the encrypted reserved amounts can all be used for remittance transactions (the first transaction) and to prevent attacks on the blockchain caused by malicious remittance, the second transaction further includes a fourth zero knowledge proof generated based on the multiple encrypted reserved amounts, so that the blockchain node (verifier) can verify whether the multiple reserved amounts included in the second transaction each are greater than or equal to zero, without knowing actual values (plaintexts) of the reserved amounts.

In yet some other embodiments illustrated in the present specification, the second transaction can further include an identifier of the remitter account, such as an account address, or an account public key and an electronic signature made by the remitter. The electronic signature is a signature made by the remitter by using a private key of the remitter to sign content such as the reserve fund list in the second transaction, or the third zero knowledge proof, or the fourth zero knowledge proof, so that the blockchain node can verify the electronic signature to prevent another node from being counterfeited as the remitter and publishing the second transaction, publishing error information, or maliciously disrupting a transaction order.

Step 204: Perform second transaction verification on the second transaction, where the second transaction verification includes a fifth verification step used to verify whether a sum of the multiple reserved amounts included in the second transaction is less than or equal to the balance of the remitter account; and if yes, the second transaction succeeds in the fifth verification step.

Similarly, because the blockchain-based remittance method provided in the present specification can be applied to a blockchain that is based on multiple consensus mechanisms, a quantity and types of blockchain nodes that perform verification on the second transaction are not limited in the present specification, and content or a process included in the second transaction verification performed based on blockchain verification rules is not limited.

In some embodiments illustrated, when the balance of the remitter account and the multiple reserved amounts undergo homomorphic encryption processing in advance, and the second transaction further includes the third zero knowledge proof generated based on the multiple encrypted reserved amounts and the encrypted balance of the remitter account, the second transaction verification includes at least a fifth verification step of performing zero knowledge verification on the third zero knowledge proof based on a zero knowledge proof algorithm, to determine whether the sum of the multiple reserved amounts included in the second transaction is less than or equal to the account balance; and if yes, the second transaction succeeds in the fifth verification step.

In yet some other embodiments illustrated, when the second transaction further includes the fourth zero knowledge proof generated based on the multiple encrypted reserved amounts, the second transaction verification further includes a sixth verification step, and the sixth verification step includes performing zero knowledge verification on the fourth zero knowledge proof based on a zero knowledge proof algorithm, to determine whether the multiple reserved amounts included in the second transaction each are greater than or equal to zero; and if yes, the second transaction succeeds in the sixth verification step.

In yet some other embodiments illustrated, as previously described, when the second transaction further includes the electronic signature made by the remitter, the blockchain node with the verification permission should further verify the electronic signature by using the public key of the remitter, so as to determine that the electronic signature and the second transaction are sent by the remitter and prevent counterfeit by other malicious nodes.

Similar to the first transaction verification, the terms "fifth" and "sixth" in the previous embodiments provided in the present specification are merely used to distinguish between verification steps included in the second transaction verification, but are not used to limit a sequence of performing the verification steps. For example, a person skilled in the art knows that, verification on an electronic signature is generally a verification step first performed in a verification stage, but a sequence of performing the previous verification steps is not limited in the present specification.

Step 206: If the second transaction succeeds in the second transaction verification, construct the reserve fund list based on the multiple reserved amounts, and update the reserve fund list to the remitter account.

After the second transaction succeeds in the verification steps included in the second transaction verification, the blockchain node should construct the reserve fund list based on the multiple reserved amounts, and update the reserve fund list to the remitter account.

Based on different consensus mechanisms relied on by an account status update process on the blockchain, a blockchain node that updates the remitter's account status can be the same as or different from the blockchain node that performs the second transaction verification. There can be one such blockchain node or multiple such blockchain nodes. No limitation is imposed in the present specification.

The reserve fund list described in some embodiments is a data organization form for the multiple reserved amounts included in the second transaction, and a specific representation form of the reserve fund list is not limited to a two-dimensional table, a tree structure, or other graphic structures.

In yet some other embodiments illustrated, to ensure that the blockchain node can conveniently verify whether the reserved amount included in the remittance transaction (first transaction) has been used in a completed remittance transaction to prevent "double-spending" remittance transactions, in the second transaction for initializing the reserve fund list, multiple reserved amounts included in the reserve fund list should be marked in the unused state, so that after at least one reserved amount is allocated to the remittance transaction, the at least one reserved amount is marked in the being-used state, and after the remittance transaction is completed, the at least one reserved amount is marked in the used-state.

Alternatively, in yet some other embodiments illustrated, to ensure that the blockchain node can conveniently verify whether the reserved amount included in the remittance transaction (first transaction) has been used in a completed remittance transaction to prevent "double-spending" remittance transactions, in the second transaction for initializing the reserve fund list, the reserve fund list further includes a unique identifier generated for each reserved amount, so that after the remittance transaction (first transaction) including the unique identifier of the reserved amount is completed, the unique identifier of the reserved amount is stored in the distributed database of the blockchain as a proof, thereby helping the blockchain node verify whether a reserved amount included in a new remittance transaction has been used in a completed remittance transaction.

Figure 3:
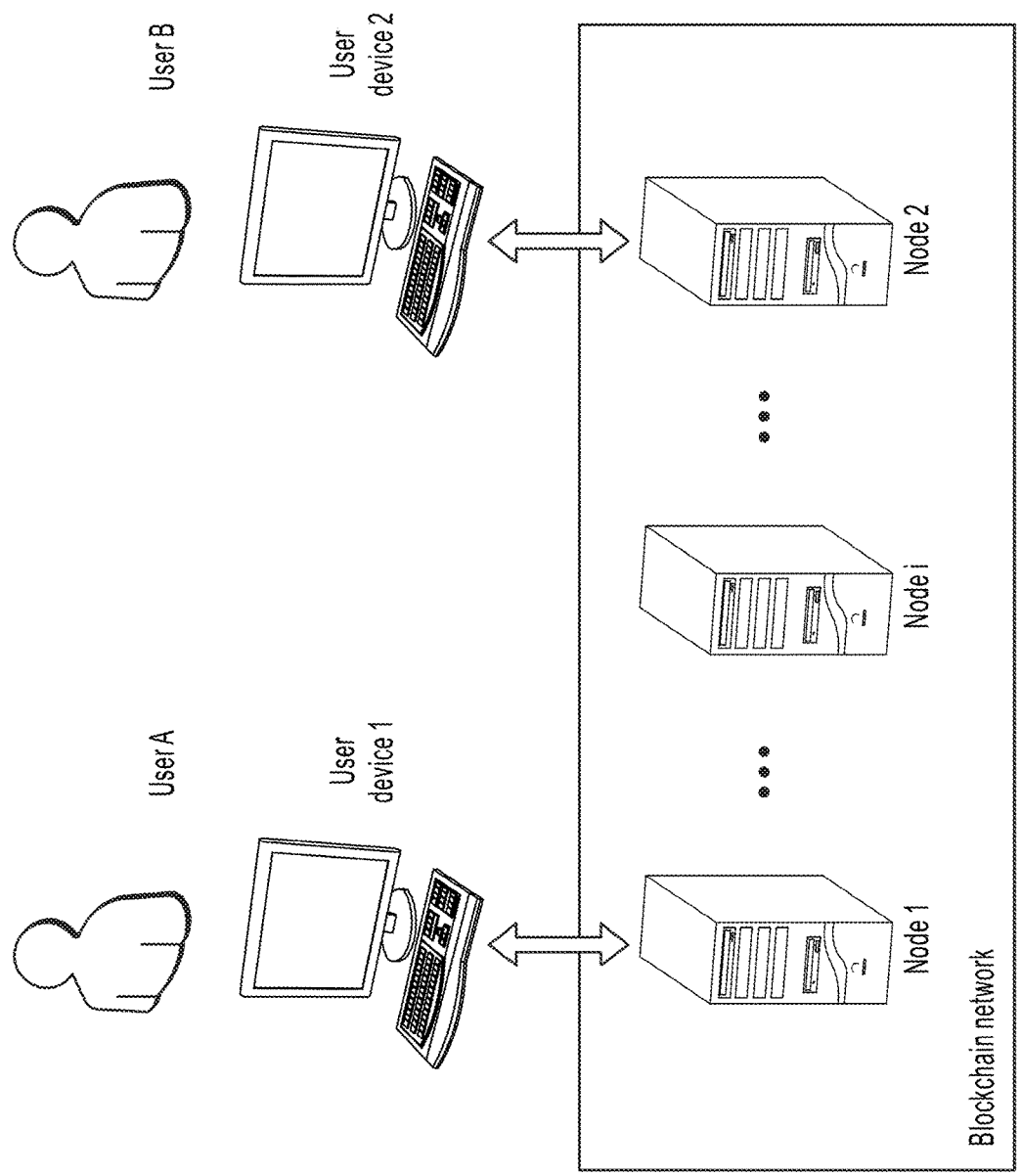
FIG. 3 is a schematic diagram illustrating a remittance transaction implementable in a blockchain network, according to some example embodiments.

For ease of understanding, the following uses a remittance transaction in a blockchain network as an example to describe the technical solutions in the present specification in detail. FIG. 3 is a schematic diagram illustrating implementation of a first transaction and a second transaction in a blockchain network, according to some example embodiments. For example, user A makes a blockchain remittance (the first transaction) to user B, and user A publishes a transaction (the second transaction) to a blockchain to initialize or update a reserve fund list included in its account prior to the remittance. The "user" in the present specification can be represented as a user account that is logged in to, and user account can actually belong to a person or an organization. No limitation is imposed in the present specification.

It is assumed that a remitter device used by user A is user device 1, for example, a user account corresponding to user A is logged in to on user device 1; similarly, a remittee device used by user B is user device 2. User device 1 can run a blockchain client program, so that a corresponding blockchain node of user device 1 exists in the blockchain network, for example, node 1 shown in FIG. 3. Similarly, user device 2 can run a blockchain client program, so that a corresponding blockchain node of user device 2 exists in the blockchain network, for example, node 2 shown in FIG. 3. Other blockchain nodes exist in the blockchain network, for example, node i to node j shown in FIG. 3. By using the previous node 1, node 2, and node i to node j, etc., the remittance transaction between user A and user B and the transaction sent by user A for initializing or updating the reserve fund list can be implemented on the blockchain network, and related transaction information can be recorded in a blockchain ledger separately maintained by each blockchain node, thereby alleviating tampering and facilitating subsequent inspection and verification.

Figure 4:
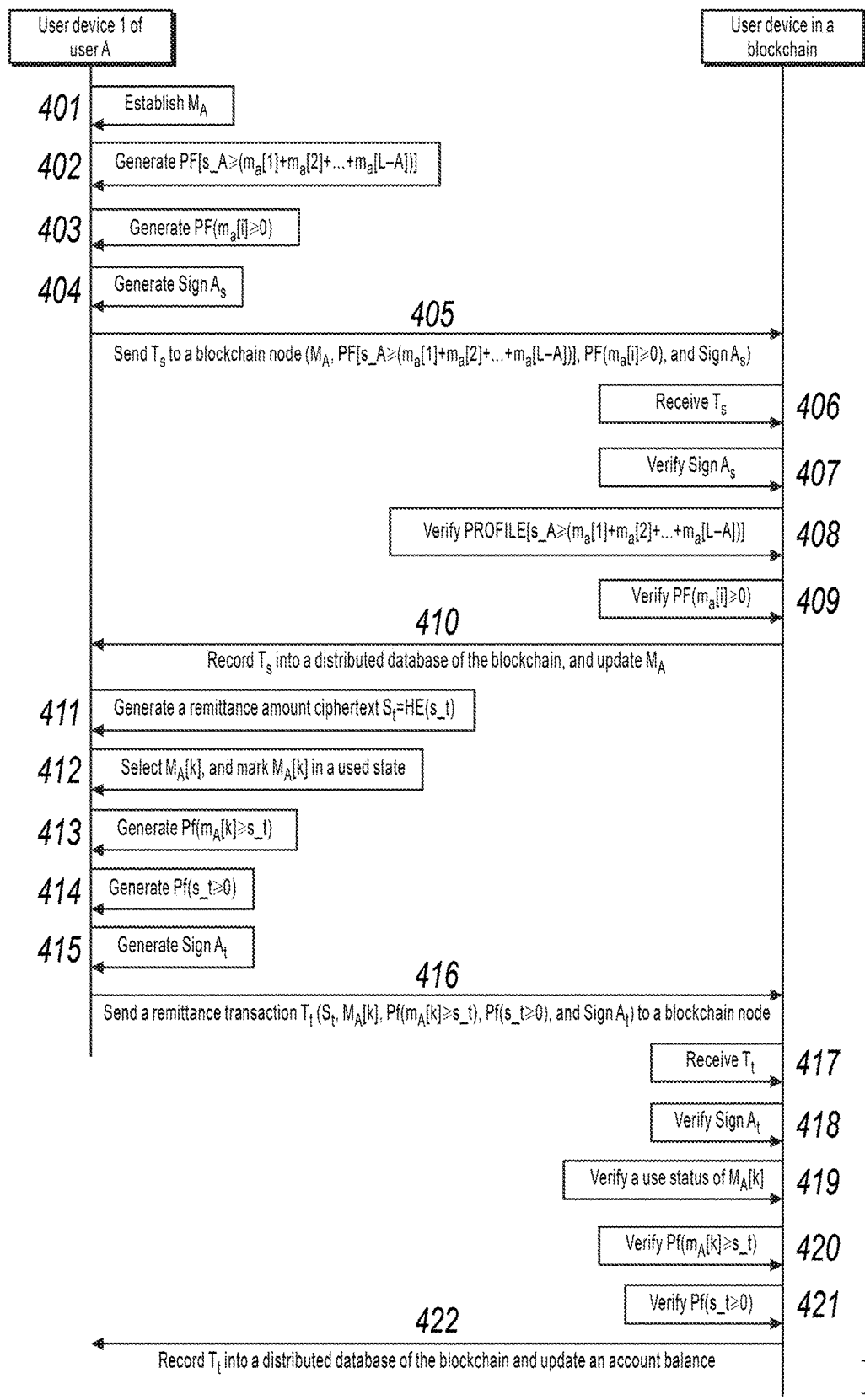
FIG. 4 is a flowchart illustrating implementation of reserve fund list setting and a remittance transaction in a blockchain network, according to some example embodiments.

FIG. 4 is a flowchart illustrating implementation of setting a reserve fund list of user A shown in FIG. 3 and executing remittance from user A to user B in a blockchain network in privacy protection mode, according to some example embodiments.

In the previous blockchain, an account balance s_A of user A and an account balance s_B of user B are encrypted based on a homomorphic encryption algorithm. An encrypted account balance ciphertext of user A is $S_A$=HE(s_A), and an encrypted account balance ciphertext of user B is $S_B$=HE(s_B). In some embodiments, the previous homomorphic encryption algorithm can be the Pederson Commit algorithm.

A process of setting the reserve fund list of user A includes the following steps:

Step 401: User A establishes a reserve fund list $M_A$, where the reserve fund list $M_A$ includes multiple reserved amounts $M_A[1]$, $M_A[2]$, . . . , and $M_A[L-A]$ that are obtained by user A by dividing its own account balance and that are encrypted based on the previous homomorphic encryption (HE) algorithm; and marks the reserved amounts $M_A[1]$, $M_A[2]$, . . . , and $M_A[L-A]$ in the reserve fund list in an "unused state".

In specific implementation, user A can divide all or a part of its account balance s_A to obtain plaintexts $m_a[1]$, $m_a[2]$, . . . , and $m_a[L-A]$ of the multiple reserved amounts, and encrypt the multiple reserved amounts based on the previous homomorphic encryption algorithm to obtain the reserved amount ciphertexts $M_A[1]$, $M_A[2]$, . . . , and $M_A[L-A]$. User A can alternatively directly divide the account balance ciphertext $S_A$ to obtain $M_A[1]$, $M_A[2]$, . . . , and $M_A[L-A]$, and perform an inverse operation based on the previous homomorphic encryption algorithm to determine the plaintexts $m_a[1]$, $m_a[2]$, . . . , and $m_a[L-A]$ corresponding to the reserved amount ciphertexts. User A can separately store mapping relationships between the reserved amount plaintexts $m_a[1]$, . . . , and $m_a[L-A]$ and the ciphertexts $M_A[1]$, $M_A[2]$, . . . , and $M_A[L-A]$, so that user A can conveniently select appropriate reserved amounts in specific remittance transactions.

Step 402: User A generates zero knowledge proofs $PF[s\_A \geq (m_a[1]+m_a[2]+ \ldots +m_a[L-A])]$ based on $M_A[1]$, $M_A[2]$, . . . , and $M_A[L-A]$ and $S_A$, to prove that the total reserved amount $m_a[1]$, $m_a[2]$, . . . , and $m_a[L-A]$ corresponding to $M_A[1]$, $M_A[2]$, . . . , and $M_A[L-A]$ in the reserve fund list $M_A$ is less than or equal to the remitter's account balance s_A. The previous zero knowledge proofs $PF[s\_A \geq (m_a[1]+m_a[2]+ \ldots +m_a[L-A])]$ do not use values of the reserved amounts $m_a[1]$, $m_a[2]$, . . . , and $m_a[L-A]$ and s_A, so that a verifier can prove that the total $m_a[1]$, $m_a[2]$, . . . , and $m_a[L-A]$ is less than or equal to s_A. In some embodiments, the previous zero knowledge proofs $PF[s\_A \geq (m_a[1]+m_a[2]+ \ldots +m_a[L-A])]$ can use a Borromean ring signature solution, a Bulletproof solution, or other range proof technologies.

Step 403: User A generates a zero knowledge proof $PF(m_a[i] \geq 0)$ based on $M_A[1]$, $M_A[2]$, . . . , and $M_A[L-A]$, to prove that the reserved amounts $m_a[1]$, $m_a[2]$, . . . , and $m_a[L-A]$ corresponding to $M_A[1]$, $M_A[2]$, . . . , and $M_A[L-A]$ in the reserve fund list $M_A$ each are not less than zero. The previous zero knowledge proof $PF(m_a[i] \geq 0)$ does not use a value of a reserved amount $m_a[i]$, so that the verifier can prove that $m_a[i] \geq 0$. In some embodiments, the previous zero knowledge proof $PF(m_a[i] \geq 0)$ can use a Borromean ring signature solution, a Bulletproof solution, or other range proof technologies.

Step 404: User A generates an electronic signature Sign $A_s$ based on $M_A$, $PF[s\_A \geq (m_a[1]+m_a[2]+ \ldots +m_a[L-A])]$, and $PF(m_a[i] \geq 0)$.

Step 405: User A sends a transaction $T_s$ to the blockchain to determine the reserve fund list $M_A$, where the transaction $T_s$ includes $M_A$, $PF[s\_A \geq (m_a[1]+m_a[2]+ \ldots +m_a[L-A])]$, $PF(m_a[i] \geq 0)$, and Sign $A_s$, where $1 \leq i \leq L\_A$.

Step 406: A blockchain node receives the transaction $T_s$.

Step 407: The blockchain node verifies the electronic signature Sign $A_s$ of the transaction Ts, and if the verification succeeds, performs the next step.

Step 408: The blockchain node performs zero knowledge verification on $PF[s\_A \geq (m_a[1]+m_a[2]+ \ldots +m_a[L-A])]$ based on a zero knowledge proof algorithm to determine whether the sum of $m_a[1]$, $m_a[2]$, ..., and $m_a[L-A]$ is less than or equal to the remitter's account balance s_A, and if yes, performs the next step.

Step 409: The blockchain node performs zero knowledge verification on $PF(m_a[i] \geq 0)$ based on a zero knowledge proof algorithm to determine whether $m_a[i] \geq 0$ each is not less than zero, where $1 \leq i \leq L\_A$; and if yes, performs the next step.

Step 410: The blockchain node records the verified transaction $T_s$ into a distributed database of the blockchain and updates the reserve fund list $M_A$ to the account of user A.

At this point, the blockchain node completes updating the reserve fund list $M_A$ of user A. A person skilled in the art knows that, an actual implementation process of setting or updating the reserve fund list $M_A$ of user A can further include many other verification steps, such as anti-replay verification, which is not limited here. In addition, the present specification does not limit a time sequence of generating each proof or electronic signature, or a time sequence of verifying each proof or electronic signature in the transaction $T_s$ proposed by the remitter on the blockchain node. FIG. 4 shows merely some embodiments of the method for setting a user's reserve fund list in the present specification. The present specification is not limited thereto.

A process of performing remittance from user A to user B by a blockchain in FIG. 4 is as follows:

Step 411: User A generates a remittance amount ciphertext $S_t = HE(s\_t)$ based on the previous homomorphic encryption algorithm, where s_t is a remittance amount transferred by user A to user B.

Step 412: User A selects, from a reserve fund list $M_A$, an unused reserved amount ciphertext $M_A[k]$ whose plaintext $m_A[k]$ can afford payment of the remittance amount s_t, and marks the reserved amount ciphertext $M_A[k]$ in a used state, so that $M_A[k]$ can no longer be allocated to another new remittance transaction.

Step 413: User A generates a zero knowledge proof $Pf(mA[k] \geq s\_t)$ based on $M_A[k]$ and $S_t$ to prove that the reserved amount $m_A[k]$ corresponding to $M_A[k]$ is sufficient to pay the current remittance amount s_t. The zero knowledge proof $Pf(mA[k] \geq s\_t)$ does not use values of $m_A[k]$ and s_t, so that a verifier can prove that $mA[k] \geq s\_t$.

Step 414: User A generates a zero knowledge proof $Pf(s\_t \geq 0)$ based on $S_t$ to prove that the remittance amount s_t is not less than zero. The zero knowledge proof $Pf(s\_t \geq 0)$ does not use the value of s_t, so that the verifier can prove that $s\_t \geq 0$.

Step 415: User A generates an electronic signature Sign $A_t$ based on $S_t$, $M_A[k]$, $Pf(m_A[k] \geq s\_t)$, and $Pf(s\_t \geq 0)$.

Step 416: User A sends a transaction $T_t$ to the blockchain to transfer a remittance to user B. The transaction $T_t$ includes $S_t$, $M_A[k]$, $Pf(m_A[k] \geq s\_t)$, $Pf(s\_t \geq 0)$, and Sign $A_t$. All of the previous content is in a ciphertext state, and therefore, remittance transaction privacy of users A and B is protected.

Step 417: The blockchain node receives the transaction $T_t$.

Step 418: The blockchain node verifies the electronic signature Sign $A_t$ in the transaction $T_t$, and if the verification succeeds, performs the next step.

Step 419: The blockchain node verifies whether $M_A[k]$ included in $T_t$ above is in the used state, and if not, performs the next step.

Step 420: The blockchain node performs zero knowledge verification on $PF(m_a[k] \geq s\_t)$ based on a zero knowledge proof algorithm to determine whether a reserved amount corresponding to $M_A[k]$ is greater than or equal to the remittance amount; and if yes, performs the next step.

Step 421: The blockchain node performs zero knowledge verification on $PF(s\_t \geq 0)$ based on a zero knowledge proof algorithm to determine whether an actual remittance amount value corresponding to the remittance amount ciphertext $S_t$ of the current remittance transaction is not less than zero; and if yes, performs the next step.

Step 422: The blockchain node records the verified transaction $T_t$ into a distributed database of the blockchain, subtracts the remittance amount ciphertext $S_t$ from user A's account balance ciphertext $S_A$ through homomorphic encryption, and adds the remittance amount ciphertext $S_t$ to user B's account balance ciphertext $S_B$, so that user A's account balance is updated to (s_A−s_t) and user B's account balance is updated to (s_B+s_t); and changes a state corresponding to $M_A[k]$ in the reserve fund list $M_A$ of user A to the used state.

In some embodiments of user A's remittance to user B described in FIG. 4, the reserve fund list $M_A$ is established in the account of user A, the reserved amount $M_A[k]$ that is sufficient to pay the remittance amount is specified for the remittance transaction, and the zero knowledge proof is generated to prove that the actual value of the reserved amount $M_A[k]$ in the remittance transaction is sufficient to pay the actual value of the remittance amount $S_t$. As such, the blockchain node can perform verification and complete the remittance transaction. There can be multiple unused reserved amounts $M_A[i]$ in $M_A$ and multiple concurrent remittance transactions can be supported, which reduces a defect of remittance transaction concurrency failure, in existing private encrypted transactions, caused by generating a zero knowledge proof based on the remitter's account balance to prove that the reserved amount is sufficient to pay the remittance amount, thereby improving a remittance transaction throughput while protecting privacy of remittance transaction data.

In addition, a person skilled in the art knows that an actual implementation process of the remittance transaction can further include many other verification steps, such as anti-replay verification, which is not limited here. In addition, the present specification does not limit a time sequence of generating each proof or electronic signature, or a time sequence of verifying each proof or electronic signature in the transaction $T_t$ proposed by the remitter on the blockchain node. FIG. 4 shows merely some embodiments of the blockchain-based remittance method in the present specification. The present specification is not limited thereto.

Although consecutive sequence numbers are used for the processes of user A's reserve fund list setting and the remittance from user A to user B in FIG. 4, it does not mean that user A needs to set a reserve fund list in its account each time before initiating a remittance transaction. A person skilled in the art knows that, before the first remittance transaction after a user registers as a user in the blockchain, the user needs to initialize and set a reserve fund list in the user's account. When encrypted reserved amounts in the reserve fund list are used up or a reserved amount corresponding to a remaining encrypted reserved amount is insufficient to pay the next remittance transaction, the user needs to reset the reserve fund list in its account. Or, the user can periodically update the reserve fund list as required.

Figure 5:
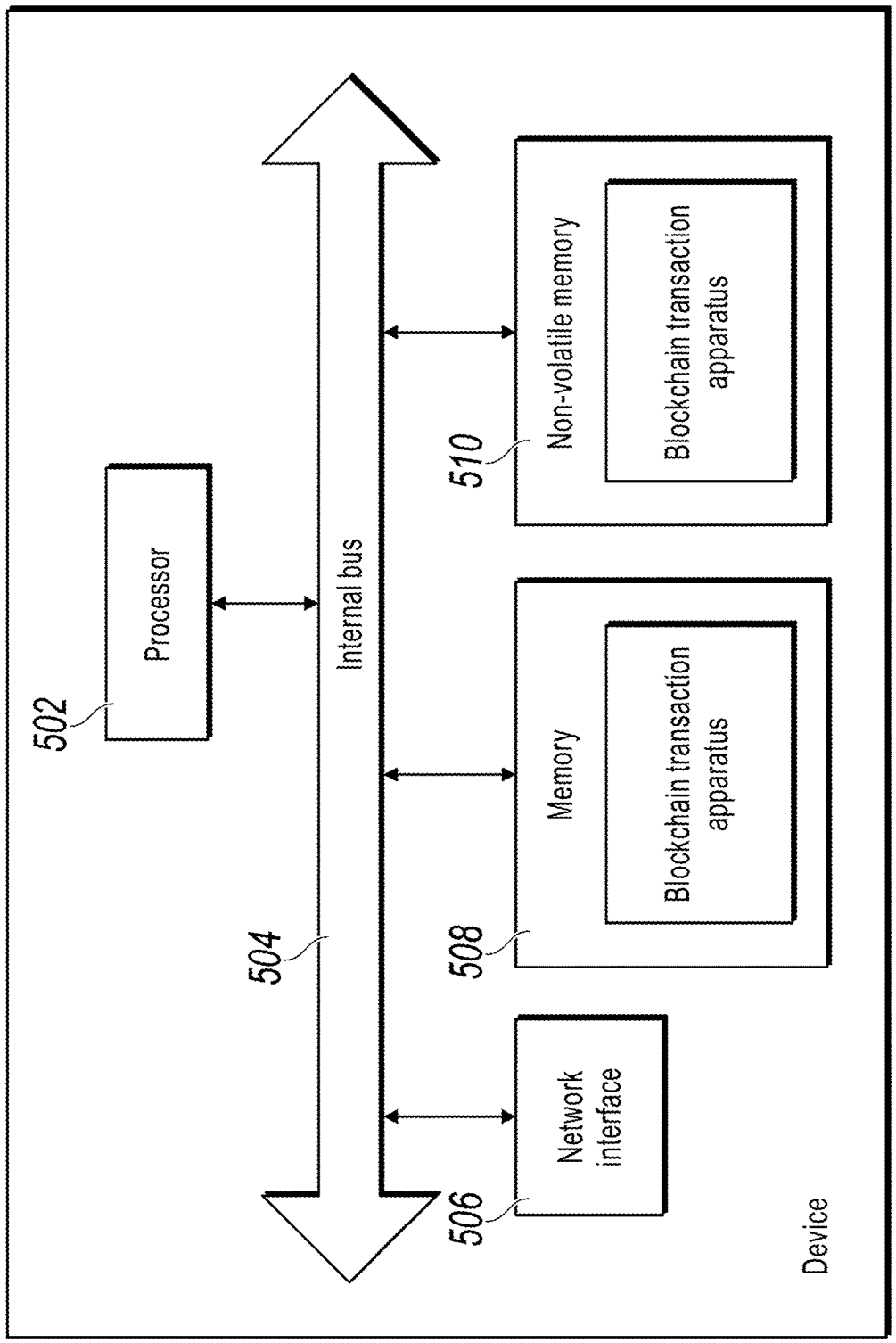
FIG. 5 is a schematic structural diagram illustrating a computer device that runs a blockchain-based remittance apparatus provided in some embodiments of the present specification, according to some example embodiments.

FIG. 5 is a schematic structural diagram illustrating a device, according to some example embodiments. Referring to FIG. 5, in terms of hardware, the device includes a processor 502, an internal bus 504, a network interface 506, a memory 508, and a non-volatile memory 510, and certainly can further include hardware needed by other services. The processor 502 reads a corresponding computer program from the non-volatile memory 510 to the memory 508 for running, and a blockchain transaction apparatus is logically formed. Certainly, in addition to a software implementation, one or more embodiments of the present specification do not exclude another implementation, for example, a logic device or a combination of hardware and software. That is, an execution body of the following processing procedure is not limited to each logical unit, and can also be hardware or a logic device.

Figure 6:
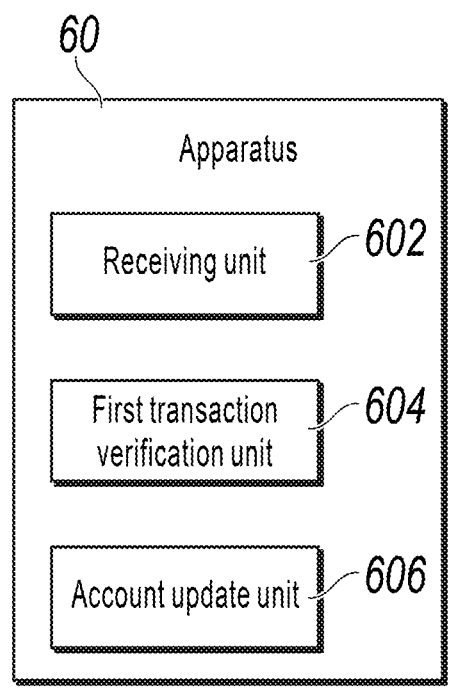
FIG. 6 is a schematic diagram illustrating a blockchain-based remittance apparatus, according to some example embodiments.

Referring to FIG. 6, the present specification further provides a blockchain-based remittance apparatus 60, where a remitter account includes a reserve fund list; and the reserve fund list includes multiple reserved amounts obtained by dividing a balance of the remitter account.

The apparatus 60 includes the following: a receiving unit 602, configured to receive a first transaction that is sent by a remitter and that is used for remittance to a remittee, where the first transaction includes a remittance amount that is remitted by the remitter account to a remittee account and at least one reserved amount that corresponds to the remittance amount and that is allocated by the remitter from the reserve fund list to the first transaction; a first transaction verification unit 604, configured to perform first transaction verification on the first transaction, where the first transaction verification unit 604 includes a first verification module 6041, configured to verify whether a total reserved amount included in the first transaction is greater than or equal to the remittance amount; and an account update unit 606, configured to, if the first transaction succeeds in the first transaction verification, deduct the remittance amount from the balance of the remitter account, and add the remittance amount to a balance of the remittee account.

In some embodiments illustrated, the first transaction verification unit 604 further includes a second verification module 6042, configured to verify whether the reserved amounts included in the first transaction are marked in a used state in the reserve fund list.

In some embodiments illustrated, the account update unit 606 is further configured to: if the first transaction succeeds in the first transaction verification, mark the reserved amounts included in the first transaction in the used state in the reserve fund list.

In some embodiments illustrated, the reserve fund list further includes unique identifiers corresponding to the multiple reserved amounts, and the first transaction further includes a unique identifier corresponding to the at least one reserved amount corresponding to the remittance amount; and the first transaction verification unit 604 further includes a third verification module 6043, configured to verify whether unique identifiers of the reserved amounts included in the first transaction have been used in a completed remittance transaction.

In some embodiments illustrated, the balance of the remitter account, the balance of the remittee account, the reserved amounts, and the remittance amount undergo homomorphic encryption processing in advance; the first transaction further includes a first zero knowledge proof generated based on the encrypted reserved amounts and the encrypted remittance amount that are included in the first transaction; the first verification module 6041 is further configured to: perform zero knowledge verification on the first zero knowledge proof based on a zero knowledge proof algorithm to determine whether a total reserved amount allocated to the first transaction is greater than or equal to the remittance amount; and the account update unit 606 is further configured to: deduct the remittance amount from the balance of the remitter account through homomorphic encryption, and add the remittance amount to the balance of the remittee account through homomorphic encryption.

In some embodiments illustrated, the first transaction further includes a second zero knowledge proof generated based on the encrypted remittance amount; and the first transaction verification unit 604 further includes a fourth verification module 6044, and the fourth verification module 6044 is configured to perform zero knowledge verification on the second zero knowledge proof based on a zero knowledge proof algorithm to determine whether the remittance amount is greater than or equal to zero.

In some embodiments illustrated, the receiving unit 602 is configured to receive a second transaction that is sent by the remitter and that is used to initialize the reserve fund list, where the second transaction includes the multiple reserved amounts obtained by dividing the balance of the remitter account; the apparatus further includes a second transaction verification unit 608, configured to perform second transaction verification on the second transaction, where the second transaction verification unit 608 includes a fifth verification module 6085, configured to verify whether a sum of the multiple reserved amounts included in the second transaction is less than or equal to the balance of the remitter account; and the account update unit 606 is configured to, if the second transaction succeeds in the second transaction verification, construct the reserve fund list based on the multiple reserved amounts, and update the reserve fund list to the remitter account.

In some embodiments illustrated, the balance of the remitter account and the multiple reserved amounts undergo homomorphic encryption processing in advance; the second transaction further includes a third zero knowledge proof generated based on the multiple encrypted reserved amounts and the encrypted balance of the remitter account; and the fifth verification module 6085 is further configured to perform zero knowledge verification on the third zero knowledge proof based on a zero knowledge proof algorithm to determine whether the sum of the multiple reserved amounts included in the second transaction is less than or equal to the balance of the remitter account.

In some embodiments illustrated, the second transaction further includes a fourth zero knowledge proof generated based on the multiple encrypted reserved amounts; and the second transaction verification unit 608 further includes a sixth verification module 6086, and the sixth verification module 6086 is configured to perform zero knowledge verification on the fourth zero knowledge proof based on a zero knowledge proof algorithm to determine whether the multiple reserved amounts included in the second transaction each are greater than or equal to zero.

In some embodiments illustrated, the account update unit 608 is further configured to: mark each reserved amount included in the reserve fund list in an unused state.

In some embodiments illustrated, the reserve fund list further includes a unique identifier generated for each reserved amount.

In some embodiments illustrated, the zero knowledge proof algorithm includes a range proof algorithm.

For an implementation process of functions and roles of each unit and module in the apparatus, reference can be made to an implementation process of a corresponding step in the previous method. For a related part, reference can be made to some descriptions in the method embodiments. Details are omitted here for simplicity.

The system, apparatus, module, or unit illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previous method embodiments, some embodiments of the present specification further provide a computer device, and the computer device includes a memory and a processor. The memory stores a computer program executable by the processor, and when executing the stored computer program, the processor performs the steps of the blockchain-based remittance method in some embodiments of the present specification. For details about the steps of the blockchain-based remittance method, reference can be made to the content above. No repetition is provided here.

Corresponding to the previous method embodiments, some embodiments of the present specification further provide a computer-readable storage medium, and the storage medium stores a computer program. When executed by a processor, the computer program executes the steps of the blockchain-based remittance method in some embodiments of the present specification. For details about the steps of the blockchain-based remittance method, reference can be made to the content above. No repetition is provided here.

The previous descriptions are merely preferred embodiments of the present specification, but are not intended to limit the present specification. Any modification, equivalent replacement, or improvement made without departing from the spirit and principle of the present specification shall fall within the protection scope of the present specification.

In a typical configuration, a computing device includes one or more processors (CPU), an input/output interface, a network interface, and a memory.

The memory can include a non-persistent memory, a random access memory (RAM), a non-volatile memory, and/or another form in a computer readable medium, for example, a read-only memory (ROM) or a flash memory (flash RAM). The memory is an example of the computer-readable medium.

The computer-readable medium includes persistent, non-persistent, movable, and unmovable medium that can store information by using any method or technology. The information can be a computer-readable instruction, a data structure, a program module, or other data.

An example of a computer storage medium includes but is not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission medium that can be configured to store information that a computing device can access. Based on the description in the present specification, the computer-readable medium does not include transitory computer-readable medium (transitory media), for example, a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that some embodiments of the present specification can be provided as methods, systems, or computer program products. Therefore, some embodiments of the present specification can use a form of hardware only embodiments, software only embodiments, or embodiments with a combination of software and hardware. Moreover, some embodiments of the present specification can use a form of a computer program product that is implemented on one or more computer-usable storage media (including but not limited to a disk memory, a CD-ROM, an optical memory, etc.) that include computer-usable program code.

What is claimed is:

1. A blockchain-based remittance method, comprising:
receiving, by a node in a blockchain network from an account of a remitter, a plurality of remittance transactions, wherein each remittance transaction is for a remittance to an account of a remittee, wherein each remittance transaction comprises a remittance amount of the remittance and at least one reserved amount corresponding to the remittance amount allocated by the remitter from a reserve fund list to the remittance transaction,
wherein the reserved fund list is maintained in the account of the remitter and comprises a plurality of reserved amounts obtained by dividing a balance of the account of the remitter, wherein at least one of the plurality of reserved amounts is allocated to each remittance transaction in the plurality of remittance transactions;
concurrently performing, by the node in the blockchain network, verification of the plurality of remittance transactions, wherein the verification of each remittance transaction comprises determining whether a total amount of the at least one reserved amount comprised in the remittance transaction is greater than or equal to the remittance amount;
in response to determining that the total amount of the at least one reserved amount comprised in each remittance transaction is greater than or equal to the remittance amount: deducting, by the node in the blockchain network, the remittance amount of each remittance transaction from the balance of the account of the remitter, and adding the remittance amount to a balance of the account of the remittee;
receiving, by the node in the blockchain network, a second transaction sent by the remitter to initialize the reserve fund list, wherein the second transaction comprises the plurality of reserved amounts;
performing, by the node in the blockchain network, transaction verification on the second transaction to verify whether a total amount of the plurality of reserved amounts comprised in the second transaction is less than or equal to the balance of the account of the remitter; and
in response to determining that the total amount of the plurality of reserved amounts comprised in the second transaction is less than or equal to the balance of the account of the remitter, constructing, by the node in the blockchain network, the reserve fund list based on the plurality of reserved amounts, and updating the reserve fund list.

2. The method according to claim 1, wherein performing the verification of each remittance transaction further comprises determining that the at least one reserved amount is marked as unused in the reserve fund list.

3. The method according to claim 1, further comprising:
in response to deducting the remittance amount from the balance of the account of the remitter, marking the at least one reserved amount as used in the reserve fund list.

4. The method according to claim 1, wherein the reserve fund list further comprises a plurality of unique identifiers corresponding to the plurality of reserved amounts, and each remittance transaction further comprises at least one unique identifier corresponding to the at least one reserved amount; and
performing the verification of each remittance transaction further comprises determining that at least one unique identifier of the at least one reserved amount is unused in a prior remittance.

5. The method according to claim 1, wherein
the balance of the account of the remitter, the balance of the account of the remittee, the at least one reserved amount, and the remittance amount are encrypted based on homomorphic encryption;
each remittance transaction further comprises a zero knowledge proof generated based on the reserved amount and the remittance amount;
determining that the total amount of the at least one reserved amount comprised in each remittance transaction is greater than or equal to the remittance amount comprises:
performing zero knowledge verification on the zero knowledge proof based on a zero knowledge proof algorithm to determine a total amount allocated to the remittance transaction is greater than or equal to the remittance amount.

6. The method according to claim 5, wherein the zero knowledge proof is a first zero knowledge proof, each remittance transaction further comprises a second zero knowledge proof generated based on the remittance amount encrypted based on homomorphic encryption; and
performing the verification of each remittance transaction further comprises performing zero knowledge verification on the second zero knowledge proof based on a zero knowledge proof algorithm to determine that the remittance amount is greater than or equal to zero.

7. The method according to claim 1, wherein the balance of the account of the remitter and the plurality of reserved amounts are encrypted based on homomorphic encryption;
the second transaction further comprises a third zero knowledge proof generated based on the plurality of reserved amounts and the balance of the account of the remitter; and
determining that the total amount of the plurality of reserved amounts is less than or equal to the balance of the account of the remitter comprises performing zero knowledge verification on the third zero knowledge proof based on a zero knowledge proof algorithm to determine that a sum of the plurality of reserved amounts comprised in the second transaction is less than or equal to the balance of the account of the remitter.

8. The method according to claim 7, wherein the second transaction further comprises a fourth zero knowledge proof generated based on the plurality of reserved amounts; and
the transaction verification on the second transaction further comprises performing zero knowledge verification on the fourth zero knowledge proof based on a zero knowledge proof algorithm to determine whether each of the plurality of reserved amounts comprised in the second transaction is greater than or equal to zero.

9. A non-transitory, computer-readable medium storing one or more instructions executable by a computer system to perform operations comprising:
receiving, from an account of a remitter, a plurality of remittance transactions, wherein each remittance transaction is for a remittance to an account of a remittee, wherein each remittance transaction comprises a remittance amount of the remittance and at least one reserved amount corresponding to the remittance amount allocated by the remitter from a reserve fund list to the remittance transaction,
wherein the reserved fund list is maintained in the account of the remitter and comprises a plurality of reserved amounts obtained by dividing a balance of the account of the remitter, wherein at least one of the plurality of reserved amounts is allocated to each remittance transaction in the plurality of remittance transactions;
concurrently performing verification of the plurality of remittance transactions, wherein the verification of each remittance transaction comprises determining whether a total amount of the at least one reserved amount comprised in the remittance transaction is greater than or equal to the remittance amount;
in response to determining that the total amount of the at least one reserved amount comprised in each remittance transaction is greater than or equal to the remittance amount: deducting the remittance amount of each remittance transaction from the balance of the account of the remitter, and adding the remittance amount to a balance of the account of the remittee;
receiving a second transaction sent by the remitter to initialize the reserve fund list, wherein the second transaction comprises the plurality of reserved amounts;
performing transaction verification on the second transaction to verify whether a total amount of the plurality of reserved amounts comprised in the second transaction is less than or equal to the balance of the account of the remitter; and
in response to determining that the total amount of the plurality of reserved amounts comprised in the second transaction is less than or equal to the balance of the account of the remitter, constructing the reserve fund list based on the plurality of reserved amounts, and updating the reserve fund list.

10. The non-transitory, computer-readable medium according to claim 9, wherein performing the verification of each remittance transaction further comprises determining that the at least one reserved amount is marked as unused in the reserve fund list.

11. The non-transitory, computer-readable medium according to claim 9, the operations further comprising:
in response to deducting the remittance amount from the balance of the account of the remitter, marking the at least one reserved amount as used in the reserve fund list.

12. The non-transitory, computer-readable medium according to claim 9, wherein the reserve fund list further comprises a plurality of unique identifiers corresponding to the plurality of reserved amounts, and each remittance transaction further comprises at least one unique identifier corresponding to the at least one reserved amount; and
performing the verification of each remittance transaction further comprises determining that the verification is successful comprises determining that at least one unique identifier of the at least one reserved amount is unused in a prior remittance.

13. The non-transitory, computer-readable medium according to claim 9, wherein the balance of the account of the remitter, the balance of the account of the remittee, the at least one reserved amount, and the remittance amount are encrypted based on homomorphic encryption;
each remittance transaction further comprises a zero knowledge proof generated based on the reserved amount and the remittance amount;
the determining that the total amount of the at least one reserved amount comprised in each remittance transaction is greater than or equal to the remittance amount comprises:
performing zero knowledge verification on the zero knowledge proof based on a zero knowledge proof algorithm to determine a total amount allocated to the remittance transaction is greater than or equal to the remittance amount.

14. The non-transitory, computer-readable medium according to claim 13, wherein the zero knowledge proof is a first zero knowledge proof, each remittance transaction further comprises a second zero knowledge proof generated based on the remittance amount encrypted based on homomorphic encryption; and
performing the verification of each remittance transaction further comprises performing zero knowledge verification on the second zero knowledge proof based on a zero knowledge proof algorithm to determine that the remittance amount is greater than or equal to zero.

15. The non-transitory, computer-readable medium according to claim 9, wherein the balance of the account of the remitter and the plurality of reserved amounts are encrypted based on homomorphic encryption;
the second transaction further comprises a third zero knowledge proof generated based on the plurality of reserved amounts and the balance of the account of the remitter; and
determining that the total amount of the plurality of reserved amounts is less than or equal to the balance of the account of the remitter comprises performing zero knowledge verification on the third zero knowledge proof based on a zero knowledge proof algorithm to determine that a sum of the plurality of reserved amounts comprised in the second transaction is less than or equal to the balance of the account of the remitter,
wherein the second transaction further comprises a fourth zero knowledge proof generated based on the plurality of reserved amounts, and
the transaction verification on the second transaction further comprises performing zero knowledge verification on the fourth zero knowledge proof based on a zero knowledge proof algorithm to determine whether each of the plurality of reserved amounts comprised in the second transaction is greater than or equal to zero.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
receiving, from an account of a remitter, a plurality of remittance transactions, wherein each remittance transaction is for a remittance to an account of a remittee, wherein each remittance transaction comprises a remittance amount of the remittance and at least one reserved amount corresponding to the remittance amount allocated by the remitter from a reserve fund list to the remittance transaction,
wherein the reserved fund list is maintained in the account of the remitter and comprises a plurality of reserved amounts obtained by dividing a balance of the account of the remitter, wherein at least one of the plurality of reserved amounts is allocated to each remittance transaction in the plurality of remittance transactions;
concurrently performing verification of the plurality of remittance transactions, wherein the verification of each remittance transaction comprises determining whether a total amount of the at least one reserved amount comprised in the remittance transaction is greater than or equal to the remittance amount;
in response to determining that the total amount of the at least one reserved amount comprised in each remittance transaction is greater than or equal to the remittance amount: deducting the remittance amount of each remittance transaction from the balance of the account of the remitter, and adding the remittance amount to a balance of the account of the remittee;
receiving a second transaction sent by the remitter to initialize the reserve fund list, wherein the second transaction comprises the plurality of reserved amounts;
performing transaction verification on the second transaction to verify whether a total amount of the plurality of reserved amounts comprised in the second transaction is less than or equal to the balance of the account of the remitter; and
in response to determining that the total amount of the plurality of reserved amounts comprised in the second transaction is less than or equal to the balance of the account of the remitter, constructing the reserve fund list based on the plurality of reserved amounts, and updating the reserve fund list.

* * * * *